(12) United States Patent
Reddy et al.

(10) Patent No.: US 7,491,335 B2
(45) Date of Patent: Feb. 17, 2009

(54) REMOVAL OF ARSENIC FROM WATER WITH OXIDIZED METAL COATED PUMICE

(75) Inventors: Pratap G. Reddy, El Paso, TX (US); Charles D. Turner, El Paso, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 136 days.

(21) Appl. No.: 11/433,638

(22) Filed: May 13, 2006

(65) Prior Publication Data

US 2007/0017871 A1    Jan. 25, 2007

Related U.S. Application Data (60) Provisional application No. 60/680,920, filed on May 13, 2005.

(51) Int. Cl.
*C02F 1/42* (2006.01)
(52) U.S. Cl. .................. 210/660; 210/661; 210/663; 210/669; 210/688
(58) Field of Classification Search ............ 210/660, 210/661, 663, 669, 688
See application file for complete search history.

(56) References Cited

U.S. PATENT DOCUMENTS

| | | | | |
|---|---|---|---|---|
| 3,567,772 A * | 3/1971 | Yanagita | .................. | 562/534 |
| 3,933,624 A * | 1/1976 | Myers | .................. | 208/253 |
| 3,966,822 A * | 6/1976 | Fukui et al. | .................. | 568/396 |
| 4,219,682 A * | 8/1980 | Stapp | .................. | 568/879 |
| 4,233,180 A * | 11/1980 | Hausberger et al. | ......... | 252/373 |
| 4,719,006 A * | 1/1988 | Goyal | .................. | 208/251 R |
| 5,037,560 A | 8/1991 | Gayman | .................. | 405/129.27 |
| D451,602 S | 12/2001 | Juhlin et al. | .............. | D24/162 |
| 6,328,777 B1 | 12/2001 | Benthaus et al. | ........... | 55/385.3 |
| 6,383,395 B1 | 5/2002 | Clarke et al. | .................. | 210/683 |
| 6,779,411 B1 | 8/2004 | Spurgeon | ................. | 76/863.23 |
| 6,841,066 B2 | 1/2005 | Nurse et al. | .................. | 210/256 |
| 6,843,912 B2 | 1/2005 | Chaney et al. | .............. | 210/234 |
| D501,912 S | 2/2005 | Tanner et al. | .............. | D23/209 |
| 6,852,224 B2 | 2/2005 | Jagtoyen et al. | .......... | 210/502.1 |
| 6,863,825 B2 | 3/2005 | Witham et al. | .............. | 210/665 |
| 6,872,303 B2 | 3/2005 | Knapp et al. | ................. | 210/206 |

(Continued)

FOREIGN PATENT DOCUMENTS

JP    58114728    7/1983

(Continued)

OTHER PUBLICATIONS

Abernathy et al., "Arsenic: Health Effects, Mechanisms of Actions, and Research Issues," *Environ. Health Perspect.*, 107(7):593-597, 1999.

(Continued)

*Primary Examiner*—Chester T Barry
(74) *Attorney, Agent, or Firm*—Fulbright & Jaworski, LLP (57) ABSTRACT

The current invention is concerned with methods and compositions for the removal of arsenic contamination from water. A method for binding As to oxidized metal coated pumice and method for making the same are disclosed. Water filters comprising oxidized metal coated pumice, such as oxidized iron coated pumice, are also provided.

24 Claims, 6 Drawing Sheets

An example method for water purification

Arsenic contaminated water
↓
(i) Treat water with an oxidizer
↓
(ii) Adjust the water pH
↓
(iii) Pass the water through an oxidized metal coated pumice matrix
↓
Water with reduced arsenic content

U.S. PATENT DOCUMENTS

| | | | |
|---|---|---|---|
| 7,291,578 B2* | 11/2007 | SenGupta et al. | 502/402 |
| 2004/0262225 A1* | 12/2004 | C. et al. | 210/638 |
| 2005/0288181 A1* | 12/2005 | Tranter et al. | 502/400 |
| 2006/0151395 A1* | 7/2006 | Gavaskar et al. | 210/660 |
| 2007/0160566 A1* | 7/2007 | Smith et al. | 424/78.3 |

FOREIGN PATENT DOCUMENTS

| | | |
|---|---|---|
| JP | 63182398 | 7/1988 |
| JP | 2001025753 | 1/2001 |

OTHER PUBLICATIONS

Adeel and Ali, In: *A Comparative Evaluation and Field Implementation of Treatment Technologies for Arsenic Removal from Groundwater*, Proc. Intl. Workshop Arsenic Mitigation in Bangladesh, Rural Dev. Coop., Bangladesh, 1-11, 2002.

Ali et al., "Development of low-cost technologies for removal of arsenic from groundwater," BUET-UNU International Workshop on Technologies for Arsenic Removal From Drinking Water, 99-120, 2001.

Driehaus et al., "Granular ferric hydroxideN a new absorbent for the removal of arsenic from natural water," *J. of Water Services Res. Tech.*, 47(1):30-35, 1998.

Emett and Khoe, "Photochemical oxidation of arsenic by oxygen and iron in acidic solutions," *Water Res.*, 35(3):649-656, 2001.

Ford, "Laboratory study of the attenuation of arsenic by iron (hydr)oxides in soils/sediments," 2003.

Johnston and Heijnen, "Safe water technology for arsenic removal," BUET-UNU International Workshop on Technologies for Arsenic Removal From Drinking Water, 1-22, 2001.

Joshi and Chaudhuri, "Removal of Arsenic from Ground Water by Iron Oxide-Coated Sand," *J. Environ. Eng.*, 769-771, 1996.

Kam et al., "Removal of heavy metals in wastewater by zeolites synthesized from cheju scoria of Korea," *Nippon Mizu Kankyo Gakki Nenkai Koenshu*, 34:470, 2000.

Minja and Ebina, "Arsenic adsorption capabilities of soil-bentonite mixtures as buffer materials for landfills," *Clay Science*, 12:41-47, 2002.

Pang et al., "Adsorption and transport of cadmium and rhodamine WT in pumice sand columns," *New Zealand Journal of Marine and Freshwater Research*, 38:367-378, 2004.

Ramaswami et al., "Batch-Mixed Iron Treatment of High Arsenic Waters," *Water Research*, 35(18):4474-4479, 2001.

Thirunavukkarasu et al., "Arsenic removal from drinking water using granular ferric hydroxide," *Water research Commisin Rep. of South Africa.* 29:161-170, 2003.

* cited by examiner

FIG. 6

REMOVAL OF ARSENIC FROM WATER WITH OXIDIZED METAL COATED PUMICE

This application claims priority to U.S. Provisional Patent application Ser. No. 60/680,920 filed May 13, 2005, which is incorporated by reference in its entirety.

BACKGROUND OF THE INVENTION

1. Field of the Invention

The invention relates generally to the field of chemistry. In particular the invention involves compositions and methods that may be used in water purification.

2. Description of Related Art

Arsenic is a naturally-occurring element in the surface and subsurface environment that ranks 20th in abundance in the earth's crust. Arsenic is present at very low concentrations in rocks and soils, which are the prime sources of arsenic in ground water. However, some arsenic in ground water is likely leached from sulfide minerals within bedrock and transported to aquifers. Sulfide minerals, in particular, are known to contain high concentrations of arsenic.

Arsenic in water occurs in two valance states, arsenite (As III) and arsenate (As V). Natural ground water contains As(III) since the reducing conditions prevail. On the other hand, As(V) is the dominant species in surface water. The exposure of humans to such arsenic contaminated water is a major concern world wide. For example, arsenic exposure has been associated with the development of skin and internal cancers. In addition to its oncogenic effects, other conditions such as diabetes, peripheral neuropathy, and cardiovascular disease have also been linked to arsenic exposure (Abernathy et al., 1999).

In developed, countries a variety of technologies are currently in use for removal of As from water sources. These technologies include ion exchange, reverse osmosis, adsorption, and electro-dialysis reversal. Though these methods are effective for As removal their complexity and cost precludes their implementation in rural areas and developing countries. Alternative methods used for arsenic removal in developing countries rely primarily of coagulation/filtration. For example, ferric chloride coagulation and filtration is currently in use in some Bangladeshi villages (Adeel and Ali, 2002). Other techniques include batch-mixed treatment with zero-valence iron to reduce arsenic from water (Anuradha et al., 2001). Granular ferric hydroxide has also been tested for the removal of arsenic from drinking water (Driehaus et al., 1998; Thirunavukkarasu et al., 2003). Studies have also been performed to test removal of arsenic from ground water by iron hydroxide-coated sand (Joshi and Chaudhuri, 1996). However, these methods are inadequate to reduce arsenic contamination levels to meet safety levels recommended by the U.S. Environmental Protection Agency (USEPA) (Adeel and Ali, 2002). The dire health effects of arsenic and the implementation of more stringent controls on arsenic levels in drinking water have created a need for an efficient and cost effective means for removal of arsenic from water supplies.

SUMMARY OF THE INVENTION

The current invention overcomes a major deficiency in the art and provides compositions and methods that enable the inexpensive and efficient removal of arsenic from water. In one embodiment, the current invention provides a composition comprising oxidized metal coated pumice. "Pumice," as used herein refers to vesicular igneous rock that is composed primarily by $SiO_2$. As used herein, the term "oxidized metal" means any metallic element that has been combined with oxygen, for example metal oxides and metal hydroxides. For instance, the oxidized metal coated pumice may comprise a coating of iron oxide or iron hydroxide or a mixture thereof. The pumice may have an average diameter of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mm or more. In certain embodiments, the oxidized metal coated pumice may comprise about or at least about 5, 10, 15, 20, 25, 30, 35, 40, 45, 50 or more g/kg of metal (i.e. grams of metal per kilogram of coated pumice).

In certain aspects of the invention, the oxidized metal coated pumice may be comprised in a filter matrix. The pumice may be used to fill any type of filter support or enclosure and the filter may comprise one or more portals to allow media to flow through the coated pumice. In certain embodiments, the coated pumice may be immobilized within an enclosure. For example, portal(s) in the enclosure may be fitted with a permeable or porous cover(s) wherein the pore size is sufficiently small to effectively immobilize the coated pumice. In another embodiment, the filter comprises an enclosure with two portals wherein the coated pumice is positioned between the two portals. In yet further embodiments, the enclosure may be a column.

In some embodiments, the invention provides a method for coating pumice with metal hydroxide comprising the steps of:

(a) contacting the pumice with a metal salt solution to make a slurry;

(b) adjusting the pH of the slurry to an alkaline pH, thereby depositing metal hydroxide onto the pumice.

In additional embodiments, a method for coating pumice may further comprise washing the pumice with water prior to contacting it with a metal salt solution. In certain further embodiments, the slurry may be incubated for 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 45, 60, 90, 120, 240 minutes or longer at the alkaline pH. The slurry may also be agitated during the incubation in order to ensure that the entire surface of the pumice is contacted with the solution. In further embodiments, the metal hydroxide coated pumice may be washed after being coated with metal hydroxide so as to remove any unbound material. For example, the coated pumice may be washed with water. In certain cases, the concentration of the metal salt solution may be about or greater than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 molar or even a saturated solution. It is also contemplated that the slurry may be adjusted to a pH of about 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, or higher, in order to deposit the metal hydroxide on the pumice. In some cases, the pH of the slurry may be raised by the addition of a base, for example, sodium or potassium hydroxide.

In still further embodiments of the invention the coated pumice is dried. For example, in certain cases, an alkaline slurry comprising pumice may be dried-down, for example by baking in an oven. In certain cases, the drying step may be followed by additional washing and drying steps. In some embodiments the drying of the coated pumice may be by exposure to heat. Thus, in certain instances, the drying step may comprise calcination of the coated pumice wherein a potion of the metal hydroxide coating is converted to a metal oxide. In certain embodiments, exposure to heat is performed in an oven or kiln. For example, the heat exposure may be preformed in rotary kiln. In some cases, the exposure to heat may reach a maximum temperature of over 100° C. For example, the exposure temperature may reach about or at least about, 100, 150, 200, 250, 300, 350, 400, 450, 500, 550, 600 or more ° C. In certain embodiments, heat exposure may be for a period of hours. For example, the coated pumice may be exposed to heat for 2, 4, 6, 8, 10, 12, 14, 16, 18, 20, 22, 24 or more hours. In some instances, drying the coated pumice may additionally comprise flowing air through the pumice.

In further embodiments of the invention, a method for coating pumice with a metal hydroxide may comprise coating the pumice with iron hydroxide. Thus, in certain embodiments, a method comprises contacting the pumice with an iron salt solution, for example ferric nitrate, and adjusting the slurry to an alkaline pH, thereby depositing iron hydroxide onto the pumice.

The invention also provides a method for removal of arsenic from water comprising the step of contacting the water with oxidized metal coated pumice. The method comprises removal or As(III) and As(V), however in some embodiments the As(III) may be converted into As(V) by oxidation. Therefore, a method of removing arsenic from water may further comprise:

(a) exposing the water to an oxidizing agent;
(b) contacting the water with oxidized metal coated pumice thereby reducing the level of arsenic in the water.

In still further embodiments of the invention, a method purifying water may further comprise adjusting the pH of the water prior to contacting the water with the oxidized metal coated pumice. For example, the pH of the water may be adjusted to about or at most about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7.3.8, 3.9, 4.0, 4.1, 4.2, 4.3, 4.4, 4.5, 4.6, 4.7, 4.8, 4.9, 5.0, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, or 7.0. Adjusting the pH of the water can be accomplished, for example, by adding a concentrated acid to the water. Acids that may be used include but are not limited to hydrochloric acid, acetic acid, nitric acid, sulfuric acid, phosphoric acid. Therefore, the method of removing arsenic from water may further comprise:

(a) exposing the water to an oxidizing agent;
(b) adjusting the pH of the water and;
(c) contacting the water with oxidized metal coated pumice, thereby reducing the level of arsenic in the water.

In some embodiments, the method of purifying water may be used to purify drinking water. In certain cases, this water may be for animal consumption, such as for human consumption. Thus, in certain embodiments, a method of the invention may be used to reduce the incidence or arsenic related diseases in a population. In other embodiments, the method could be used to purify arsenic contaminated waste water. This may be important in reducing arsenic contamination of surface water sources, and also to reduce leaching into subterranean water reservoirs.

In certain embodiments of the invention, a method for water purification may involve a batch purification. For example, the water may be mixed with the oxidized metal coated pumice then the pumice allowed to settle out of the water. However, in certain embodiments, a method of purifying water may comprise passing the water through a filter comprising coated pumice. In further embodiments, the filter may comprise one or more columns comprising oxidized metal coated pumice. It is contemplated that water may flow through said columns in either an up-flow or a down flow direction. Therefore, in some embodiments, the water is passed though the filter in an up flow direction such that contact with the coated pumice is maximized. Water may be passed through the filter for example, by gravity flow, by a siphon, or by a mechanical pump.

In certain embodiments, a filtration method according to the invention may be undertaken on a large scale for filtration of public use water sources. However, in other embodiments, the invention provides a method for small scale removal of arsenic. For instance, coated pumice could be provided in removable filter cassettes for household use. These cassettes could be replaced on a regular basis in order to prevent saturation of the oxidized metal coated pumice with As.

In still further embodiments, a water purification method according to the invention may comprise contacting the water with oxidized metal coated pumice for about or at least about 1, 2, 3, 4, 5, 6, 7, 8, 9, 10, 15, 20, 25, 30 or more minutes. Thus, in certain instances, the contact time of water with the oxidized metal coated pumice may be increased, for instance, by recirculating water through a coated pumice filter or by adjusting the flow-rate of water through a filter comprising the coated pumice.

In additional embodiments, the invention provides a method for disposal of arsenic from water purification comprising the steps of;

(a) contacting water with oxidized metal coated pumice thereby reducing the level of arsenic in the water and,
(b) disposing of the spent oxidized metal coated pumice.

It is envisioned that disposal of the spent oxidized metal coated pumice could comprise burying it in a landfill. Since the As remains tightly bound to the oxidized metal coated pumice, As captured by the method of the invention may be disposed of inexpensively and without environmental risk.

Embodiments discussed in the context of a methods and/or composition of the invention may be employed with respect to any other method or composition described herein. Thus, an embodiment pertaining to one method or composition may be applied to other methods and compositions of the invention as well.

As used herein the specification, "a" or "an" may mean one or more. As used herein in the claim(s), when used in conjunction with the word "comprising", the words "a" or "an" may mean one or more than one. As used herein "another" may mean at least a second or more.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
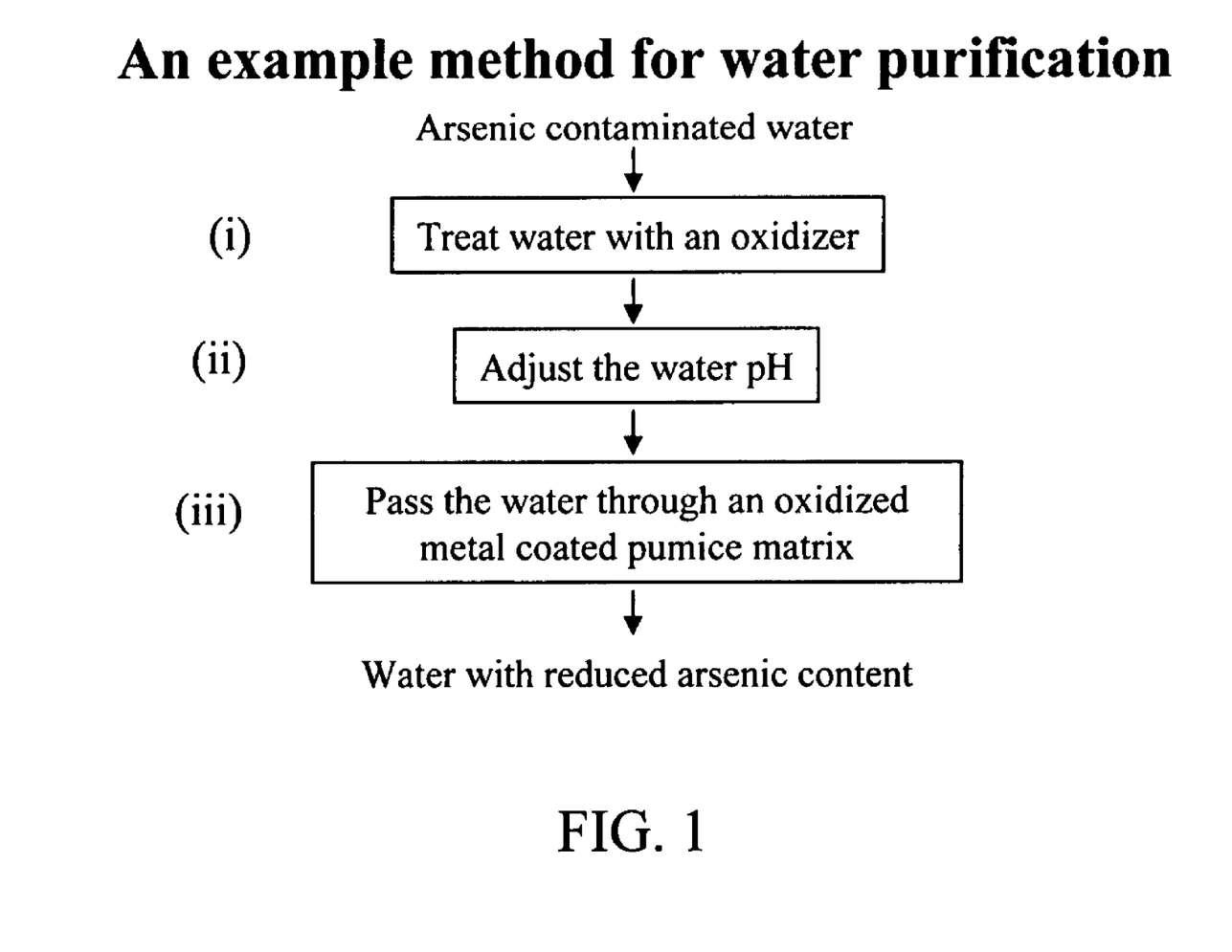
FIG. 1: A flow chart that exemplifies arsenic removal procedure of the invention.
Figure 2:
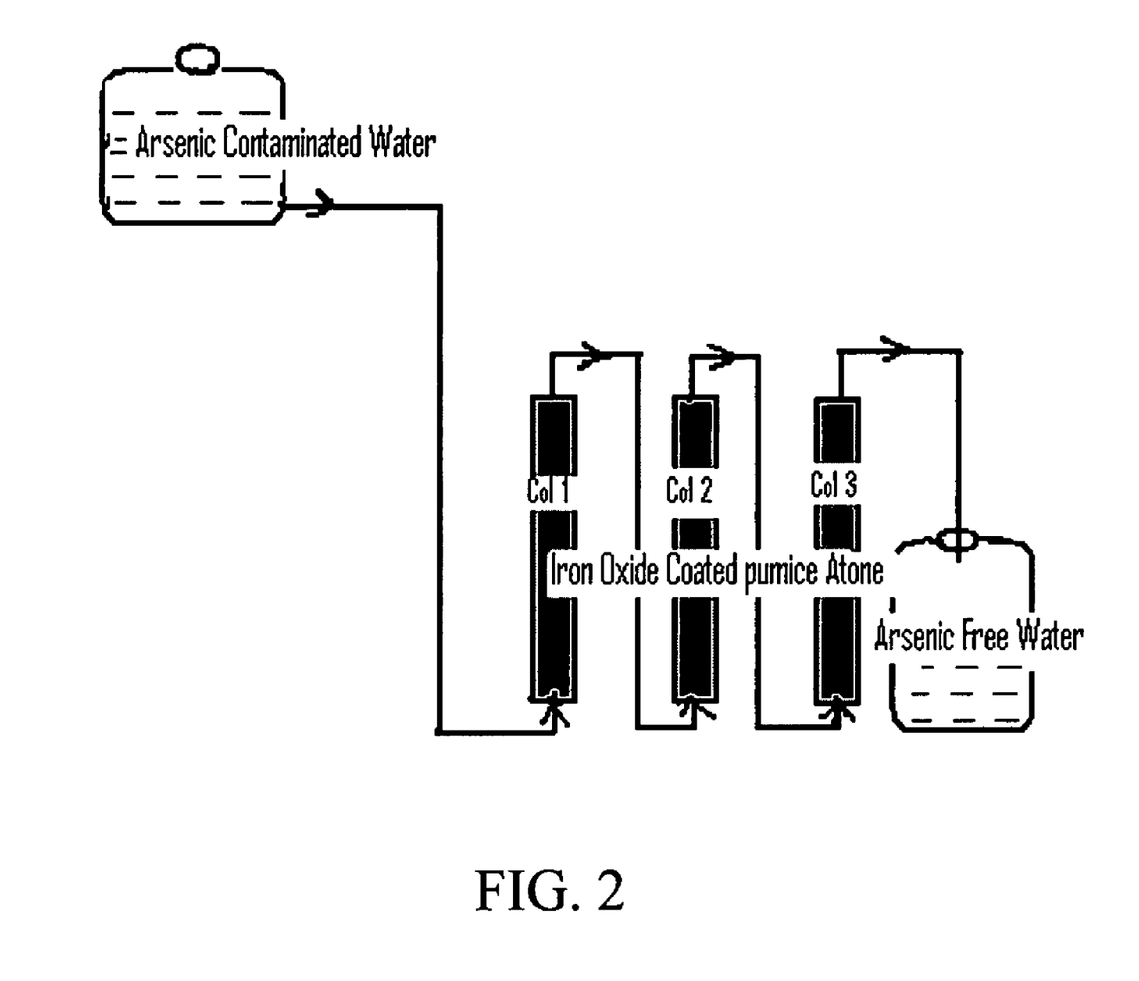
FIG. 2: An example of a filtration apparatus according to the invention. The embodiment depicted is a up-flow three column purification scheme.

The current invention provides methods and compositions that may be used to reduce arsenic contamination in water. One exemplary method for removal of arsenic from water is depicted in the flow chart of FIG. 1. In certain embodiments of the invention, arsenic contaminated water is passed through an oxidized metal coated pumice matrix and may comprise passing the water through one or more columns packed with the coated pumice. An example of a column purification apparatus is depicted in FIG. 2. In this example, water is passed through three columns packed pumice coated with oxidized iron, in an up-flow direction, driven by gravity feed.

Studies herein, demonstrate that oxidized metal coated pumice is superior to other possible arsenic binding materials. In one example, the ability of various materials to absorb arsenic from a solution is demonstrated (Table 2). Data indicated that pumice coated with oxidized iron was by far the most effective absorbent material. Further studies using sand, zeolite, and pumice coated with oxidized iron confirmed that the coated pumice was able to remove up to 98% of As(V) compared to 78% and 82% for coated zeolite and sand respectively. For example, at equilibrium, water treated with oxidized iron coated pumice had 16 times less arsenic than water treated with a similar amount of coated sand. These data indicate that of all adsorbents tested only the coated pumice was able to reduce As contamination in water to levels below those deemed safe by the United States Environmental Protection Agency, 10 µg/L.

Studies herein also show that oxidized metal coated pumice has a high binding capacity for arsenic, which would be of great value in industrial applications. When contaminated water was filtered through a column comprising pumice coated with oxidized iron the effluent water demonstrated levels of As contamination below 10 µg/L (10 ppb) until 4000 bed volumes of water contaminated with 100 µg/L had been passed though the column (Table 4). Thus, the coated pumice is both effective in reducing As levels water and efficient in binding large quantities of As from contaminated water.

Furthermore, it is demonstrated that spent oxidized metal coated pumice can be safely disposed of in landfills, since the As remains tightly bound. This is highly advantageous since disposal of toxic materials is both expensive and hazardous to the environment.

I. Oxidation of Aqueous Solutions

In some applications of the current invention, it may be preferable to oxidize water prior to contacting the water with oxidized metal coated pumice. As(V) is bound to coated pumice more efficiently than As(III) since As(III) is predominantly uncharged at a pH 9.2 or less. Thus, oxidative conversion of As(III) into As(V) may increase the efficiency of arsenic removal. In some cases, oxidation also has the added beneficial effect of sterilizing water. For this reason, oxidative steps are included in many water purification strategies. Direct oxidation of As(III) can be carried out with chemicals including but not limited to, ozone, chlorine gas, hypochlorite, permanganate, hydrogen peroxide, Fenton's reagent ($H_2O_2/Fe^{2+}$), or manganese oxides (Johnston and Heijnen, 2001). An exemplary method for oxidizing water with ozone comprises; contacting the water with about 2 mg/L of ozone for 1, 2, 3, 4, 5, 6, 7, 8, 9, 10, 15, 30, 60 minutes or longer (Nieminski and Evans, 1995). Other methods for As(III) oxidation comprise exposure to ultraviolet radiation however this process is inefficient unless catalyzed, for instance by the addition of sulfite (Ghurye and Clifford, 2000), ferric iron (Emett and Khoe, 2001), or citrate (EAWAG, 1999). Another method for oxidation of As(III) involves treatment of water with $CeO_2$ as disclosed in U.S. Pat. No. 6,863,825.

II. Coating Pumice with Metal Hydroxide

In certain aspects of the current invention, metal hydroxides are deposited onto pumice. Metal hydroxides are known for the ability to bind As ions in solution, their insolubility in water makes them ideal for coating onto the pumice matrix (U.S. Pat. No. 6,383,395; Joshi and Chaudhuri, 1996). Methods for deposition of metal hydroxides are known to those of skill in the art. One method, for example, is precipitation of the hydroxide from a metal salt solution by addition of a base. Briefly, a metal salt that is soluble in water, such as those listed in Table 1, is put in solution and the solution contacted with pumice. The pH of the solution is then increased by the addition of a base. For example, Li, Na, K, Rb or Cs hydroxide salts or solutions thereof are added to the metal salt solution, thereby depositing insoluble metal hydroxide onto the pumice. Thus, metal hydroxide coatings may comprise, Mg, Al, Sc, Ti, V, Cr, Mn, Fe, Co, Ni, Cu, Zn, Y, Zr, Nb, Mo, Ru, Rh, Ag, Cd, In, Sn, La, Ce, Pr, Nd, Pm, Sm, Eu, Gd, Tb, Dy, Ho, Er, Tm, Yb, Lu, Hf, Ta, W, Re, Os, Ir, Pb, Bi, or Po hydroxides or any mixture thereof.

TABLE 1

Metal salt water solubility

| Soluble Salts | Exceptions |
|---|---|
| Metal nitrates ($NO_3^-$), nitrites ($NO_2^-$), chlorates ($ClO_3^-$) and perchlorates ($ClO_4^-$). | Silver nitrates and potassium perchlorate are considered slightly soluble. |
| Metal halogen salts ($Cl^-$, $Br^-$, $I^-$) | Ag, Hg, Cu and Tl halogen salts are insoluble. $HgBr_2$ and Pb halogen salts are slightly soluble. |
| Metal acetate salts ($C_2H_3O_2^-$) | Silver acetate and mercuric acetate are insoluble. |
| Metal sulfate ($SO_4^{2-}$) salts | Ca, Sr, Ba, Ra, Pb, Ag, and Hg sulfate salts are insoluble to slightly soluble. |

Salts for use in coating pumice stone include, for example, metal nitrate salts. An example reaction is given in (a), wherein the variable "X" is any metal that is soluble as a nitrate salt, and "Y" may equal 1, 2, or 3.

(a)

Thus, a method for coating pumice may, in some instances, comprise the steps of;

(a) contacting the pumice with a solution comprising $X(NO_3)_y$ to make a slurry, (b) adjusting the slurry to an alkaline pH thereby depositing $X(OH)_y$ onto the pumice.

In certain aspects of this method, the slurry may be adjusted to an alkaline pH by the addition of sodium hydroxide. The sodium hydroxide may be added as solid pellet or as solution. The pH of the solution may be adjusted slowly over a time period of seconds, minutes or hours to modulate the deposition rate of $X(OH)_y$.

In some embodiments, the pH of the solution may adjusted by the addition of urea, followed by heating of the solution, for example to 60-100° C. In this embodiment as the temperature of the solution rises the urea decomposes generating ammonium hydroxide and thus increasing the pH of the solution. In certain instances, acetamide, hexamethylenetetramine, propionamide or other precipitation agents may be substituted for the urea in the procedure.

In some embodiments of the invention, the metal hydroxide deposited on the pumice is titanium hydroxide. Some exemplary titanium salt solutions include titanium oxysulfate, titanium sulfate, titanium nitrate and titanium potassium oxalate.

In yet further embodiments, a slurry according to the invention may comprise pumice, one or more metal salts ($X(NO_3)_y$), and other components that modulate the deposition of metal hydroxides ($X(OH)_y$) onto the pumice. In certain aspects of the invention, compounds that modulate the deposition of metal hydroxide may be added to metal salt solutions prior to or during precipitation. Such modulators may comprise metal chelators such as EDTA, other salt solutions, or organic polymers. In other aspects of the invention, the pH of the metal salt solution may be adjusted slowly and/or the solution may be agitated in order to modulate the deposition of metal hydroxides onto the pumice. The deposition of metal hydroxide may also be modulated by adjusting the temperature of the slurry during the deposition reaction.

III. Determination of As Concentration

The level of arsenic contamination in water may be determined by any of the methods that are well known in the art. For example, arsenic levels in a sample may be determined by inductively coupled plasma mass spectrometry (ICP-MS). ICP-MS instruments use an inductively coupled plasma torch to atomize samples in a 7,000 to 10,000° K. argon plasma. The plume of the argon plasma is sampled directly into the aperture of a quadruple mass spectrometer. Analyte ions produced by the plasma are accelerated, magnetically separated and counted using an electron multiplier.

Test kits that measure Arsenic levels by first converting inorganic arsenic into arsine gas are also well know to those in the art, and kits for such assays may be purchased from Hach™.

IV. Other Contaminants Bound by Pumice Coated with Oxidized Metal

In certain embodiments, the methods and compositions of the current invention can be used to remove other contaminants from water. For example, the invention may be used to remove selenate, chromate, borate, perchlorate, or fluoride. In other embodiments, it is envisioned that the current invention could be used in the removal of heavy metals from water including but not limited to mercury, lead and cadmium.

V. Factors that Modulate the Binding of As

Factors such as arsenic oxidation state, pH of source water, and competing ions have significant effects on the arsenic removal by the oxidized metal coated pumice stone. Studies herein demonstrate that increasing pH from 4.0 to 10.0 decreased the adsorption of Arsenic by 100%. At pH 4.0, 7.0, and 10.0, the absorption of Arsenic(V) was 98%, 39, and 0% respectively. Several studies have also shown, that the optimum pH for arsenic removal by absorption process to be in the range of 5.5 to 6.0. Therefore in certain aspects of the invention, water is acidified prior to contacting it with coated pumice.

Competing ions in water may also modulate the efficacy of As adsorption by oxidized metal coated pumice. In a laboratory batch test 1.8 grams of pumice coated with oxidized iron removed 96% arsenic from the water containing no competing species. Increasing concentration of sulfate, nitrate, nitrite, chloride, and phosphate, decreased the arsenic removal capacity. However, the presence of calcium ($CaCO_3$) and magnesium (MgO), did not appear to effect arsenic(V) removal from the water by the coated pumice. Therefore, in certain instances it may be preferable that the coated pumice be used in the removal of arsenic from water sources with low levels of sulfates, nitrates, nitrites, chlorides and phosphates. In other embodiments, competing ions may be removed from the water by methods know to those of skill in the art prior to contacting the water the coated pumice. For example, the water maybe filtered, distilled or subjected to a membrane process, such as reverse osmosis.

VI. Water Filters Comprising Oxidized Metal Coated Pumice

The current invention also provides an apparatus for the removal of arsenic from water. In certain embodiments, such an apparatus may comprise filters packed with iron oxide coated pumice. In some cases, filters may be removable cassettes that could be easily replaced when arsenic binding capacity of the filter matrix is exhausted. Oxidized metal coated pumice could be used as the filter matrix in a variety filter types such as those described in U.S. Pat. Nos. 6,843, 912, 6,841,066, 6,779,411, 6,328,777, D501,912, or D451, 602, all incorporated herein by reference.

In certain further embodiments of the current invention, water may be passed through other types of filters either before or after arsenic removal to reduce other contaminates in the water, for example organic contaminates such as viruses, bacteria and fungus. Some examples of these types of filters are found in U.S. Pat. Nos. 6,872,303 and 6,852,224, incorporated herein by reference.

EXAMPLES

The following examples are included to further illustrate various aspects of the invention. It should be appreciated by those of skill in the art that the techniques disclosed in the examples that follow represent techniques and/or compositions discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Coating Pumice with Iron Hydroxide

Natural pumice stones were broken into aggregate size US Sieve Size No. 18×20 and coated with iron hydroxide by the procedure similar to that of Joshi and Chaudhuri (1996). The procedure comprised pre-washing of pumice stone by immersing in deionized (DI) water for 24 hours, drying them in an oven at 105° C. for 14 hours. After drying, pumice stones were saturated with 2M ferric nitrate (2M $Fe(NO_3)_3.9H_2O$), prepared by dissolving 808 g $Fe(NO_3)_3.9H_2O$ in DI water and diluting to 1000 ml. The pH of the mixture was adjusted to 11 with 10N sodium hydroxide solution. The mixture was mixed for two minutes and dried in an oven at 110° C. for 14 hours. The coated Pumice Stone was washed with distilled water and the runoff was removed, the material was dried in an oven at 105° C. for 14 hours, and stored in a plastic bottle.

Example 2

Screening Material for As Removal

Several materials have been examined for arsenic removal by adsorption. The materials selected for screening test were natural pumice stone, pumice stone coated with oxidized iron, natural zeolite, zeolite coated with oxidized iron, black sand, red sand, red soil, iron slag, red shale, hematite, copper slag, and natural garnet.

Initially, indicated concentrations of adsorbent materials were placed in individual batch reactors (plastic bottles) containing arsenic(V) ($Na_2HAsO_4.7H_2O$) spiked water. The concentration of the As(V) in the water was 100 µg/L. The pH of the water was about 6 and the temperature was 250° C. The slurry was agitated with a mechanical shaker for 12 hours to give adequate contact between the adsorbent and dissolved arsenic(V). After sufficient contact time, water samples from each reactor were drawn and analyzed for total arsenic. The laboratory results and other relevant data for screening test are presented in Table 2.

Figure 3:
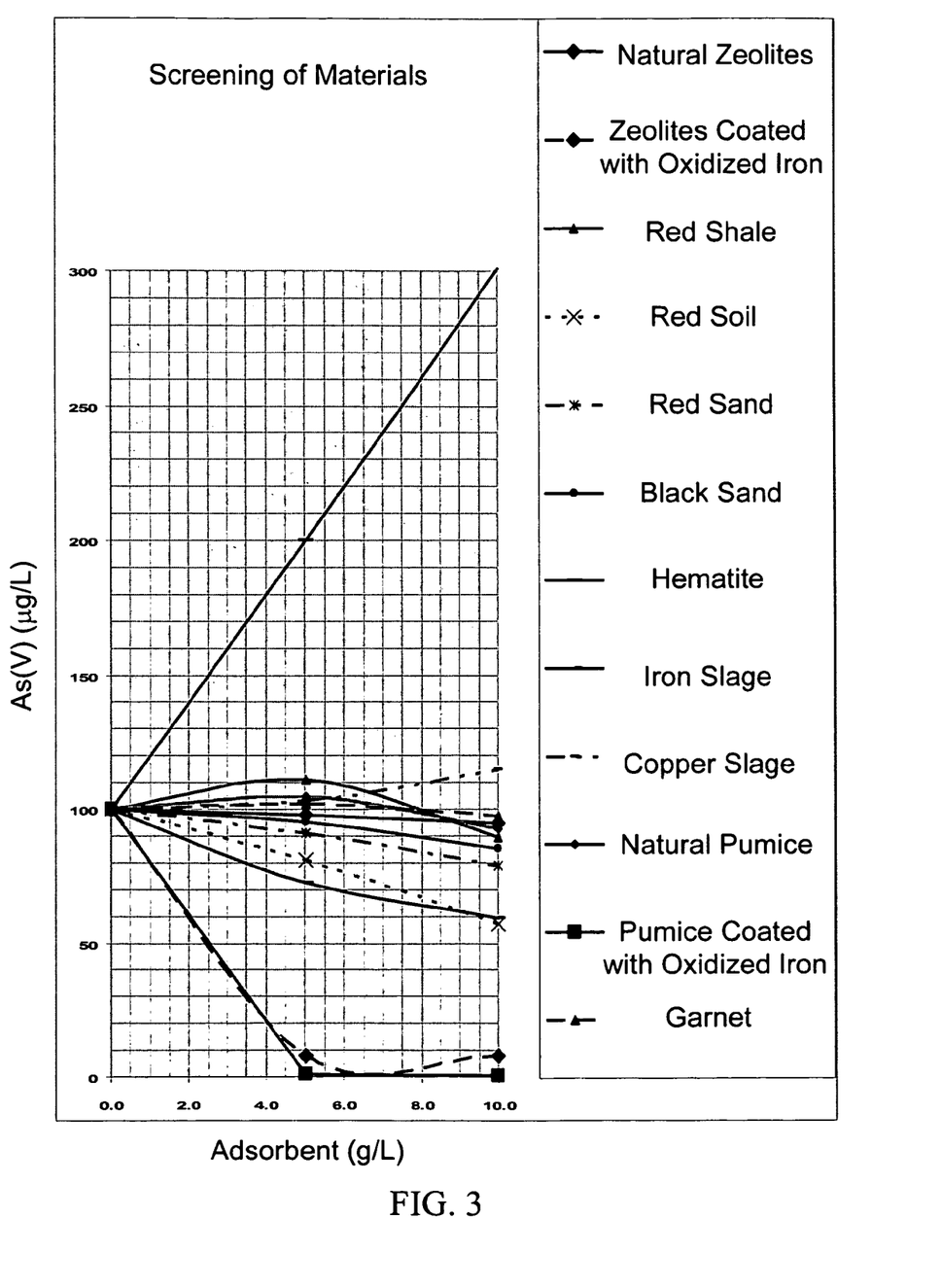
FIG. 3: Graphical depiction of the data from Table 2. The graph demonstrates the As(V) absorbent capacity of various candidate materials. Data are plotted as concentration of absorbent (X axis) versus remaining As(V) in the media following incubation (Y axis).

The laboratory results for initial screening tests are shown in the Table 2 and presented in FIG. 3. The arsenic adsorbed by the red soil, red sand, black sand, iron slag, and garnet were negligible. The natural zeolite and natural pumice stone did not adsorb any arsenic from water. The red shale, hematite, and copper slag leached arsenic into the water. The zeolite coated with oxidized iron and pumice stone coated with oxidized iron adsorbed about 90% and 99% arsenic(V) from the water respectively. Based on these data, the coated pumice stone, coated zeolite, and coated black sand were selected for batch adsorption test.

TABLE 2

| Adsorbent (g/L) | $C_0$ (µg/L) | $C_e$ (µg/L) |
|---|---|---|
| Natural Zeolite | | |
| 0.0 | 100 | 100 |
| 5.0 | 100 | 97.7 |
| 10.0 | 100 | 94.5 |
| Zeolite coated with oxidized iron | | |
| 0.0 | 100 | 100 |
| 5.0 | 100 | 8.15 |
| 10.0 | 100 | 7.81 |
| Red Shale | | |
| 0.0 | 100 | 100 |
| 5.0 | 100 | 111 |
| 10.0 | 100 | 89.6 |
| Red Soil | | |
| 0.0 | 100 | 100 |
| 5.0 | 100 | 80.9 |
| 10.0 | 100 | 57.2 |

TABLE 2-continued

| Adsorbent (g/L) | $C_0$ (µg/L) | $C_e$ (µg/L) |
|---|---|---|
| Red Sand | | |
| 0.0 | 100 | 100 |
| 5.0 | 100 | 90.8 |
| 10.0 | 100 | 78.8 |
| Black Sand | | |
| 0.0 | 100 | 100 |
| 5.0 | 100 | 95.1 |
| 10.0 | 100 | 85.4 |
| Hematite | | |
| 0.0 | 100 | 100 |
| 5.0 | 100 | 200 |
| 10.0 | 100 | 301 |
| Iron Slag | | |
| 0.0 | 100 | 100 |
| 5.0 | 100 | 72.1 |
| 10.0 | 100 | 59.2 |
| Copper Slag | | |
| 0.0 | 100 | 100 |
| 5.0 | 100 | 103 |
| 10.0 | 100 | 115 |
| Natural Pumice Stone | | |
| 0.0 | 100 | 100 |
| 5.0 | 100 | 105 |
| 10.0 | 100 | 92.6 |
| Pumice coated with oxidized iron | | |
| 0.0 | 100 | 100 |
| 5.0 | 100 | 0.826 |
| 10.0 | 100 | 0.46 |
| Garnet | | |
| 0.0 | 100 | 100 |
| 5.0 | 100 | 102 |
| 10.0 | 100 | 97.1 |

Example 3

Screening Candidate Material for As Removal

Figure 4:
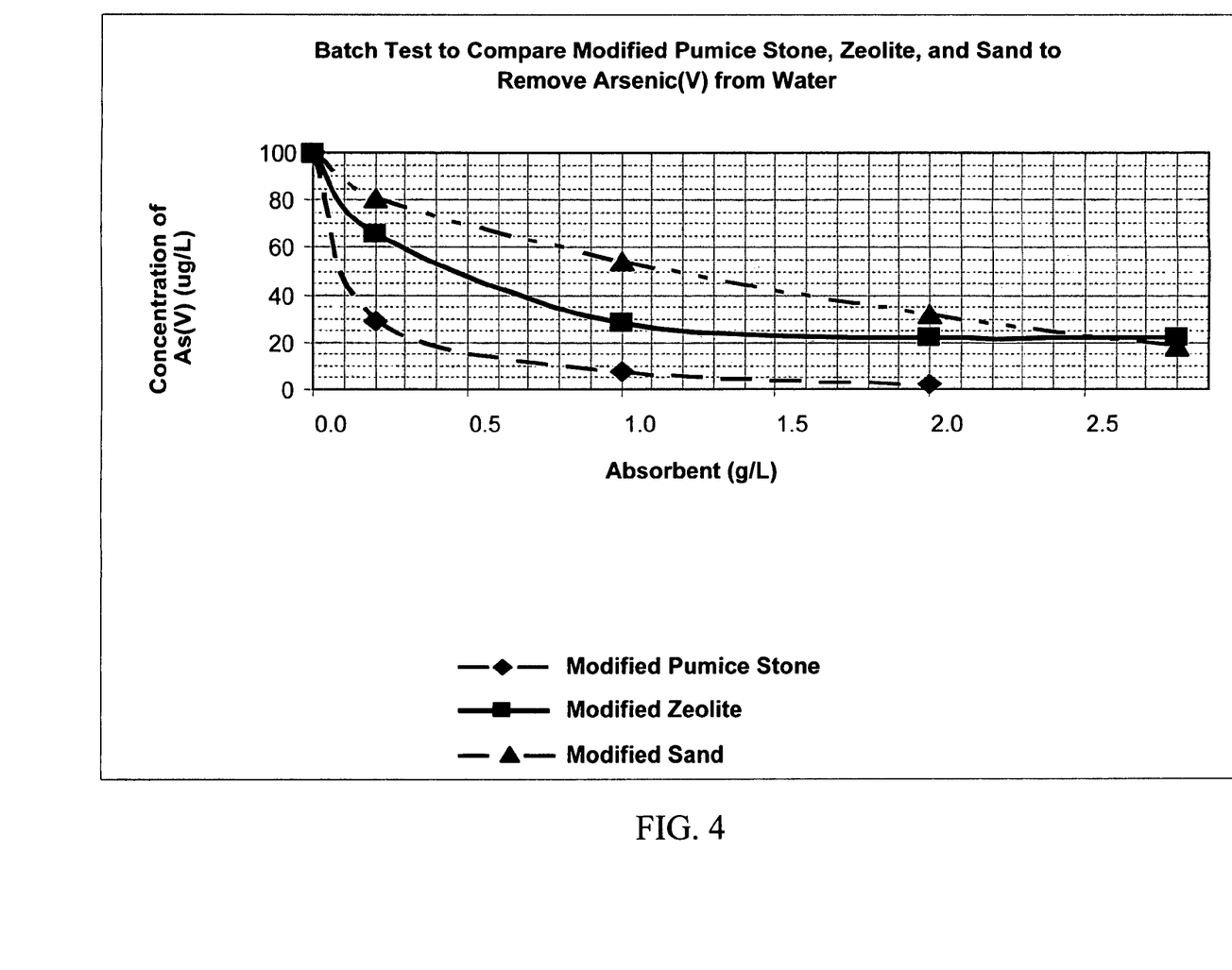
FIG. 4: Graphical depiction of the data from Table 3. The absorbent capacity of three substrates coated with oxidized iron are compared. The Y-axis indicates the remaining As(V) after incubation with absorbent materials, as a function of the concentration of each material (X axis).
Figure 5:
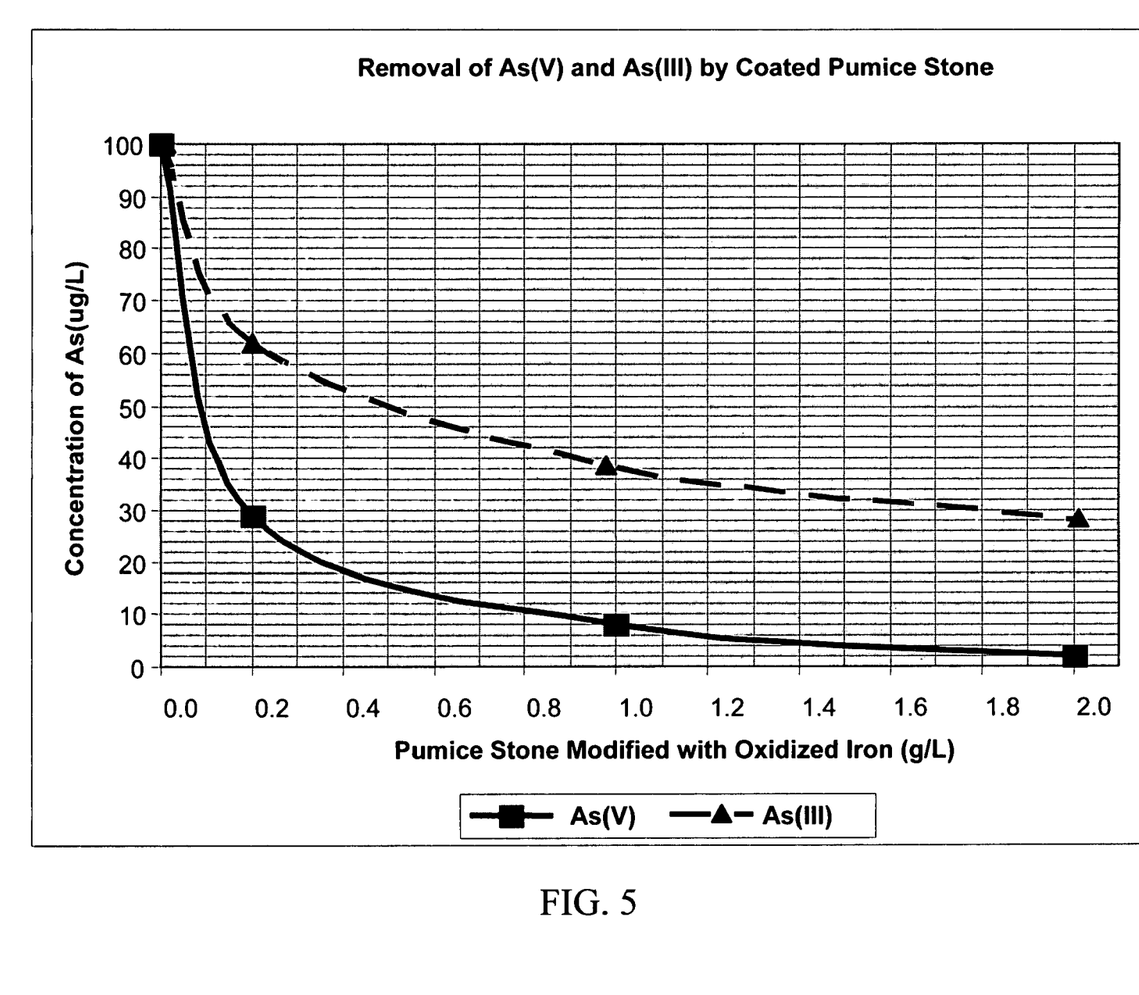
FIG. 5: Demonstrates the efficiency of As(III) and As(V) removal from water by pumice coated with oxidized iron (data from Table 4). The Y axis indicates the remaining concentration of As versus the concentration of the coated pumice (X axis).

Pumice stone, zeolite, and sand each coated with oxidized iron were selected for further testing. The black sand was coated with ferric nitrate by the procedure similar to that of Joshi and Chaudhuri (1996). The absorption of each material was evaluated in batch reactions. Initially 0.2, 1.0, 2.0, and in some cases 2.8 grams of adsorbent material was weighed and transferred into individual batch reactors (plastic bottles) containing 1000 ml arsenic spiked water (100 (µg/L)). The slurry was agitated with a mechanical shaker for 14 hours to obtain adequate contact between the arsenic in water and the adsorbents. After sufficient contact time, samples were drawn, filtered, preserved with nitric acid, and delivered to the laboratory for analysis for arsenic. The results for batch tests are shown in Table 3 and FIG. 4.

As presented in the Table 3, 2.0 g/L of coated pumice stone adsorbed 98% detectable arsenic(V) ($Na_2HAsO_4.7H_2O$) from water. However, only about 80% of the arsenic was removed by either coated zeolite or coated black sand, even when 2.8 g/L of material was used. Therefore, it was concluded that the pumice stone coated with oxidized iron was by far the most viable material to adsorb arsenic from water and thus it was selected for laboratory column tests.

TABLE 3

| Adsorbent (g) | As (V), $C_0$ (µg/L) | $C_e$ (µg/L) | As(V) Removed (%) |
|---|---|---|---|
| Pumice coated with oxidized iron | | | |
| 0.0 | 100 | 100 | 0 |
| 0.20 | 100 | 29 | 71 |
| 1.00 | 100 | 8 | 92 |
| 2.00 | 100 | 2 | 98 |
| Zeolite coated with oxidized iron | | | |
| 0.0 | 100 | 100 | 0 |
| 0.20 | 100 | 66 | 34 |
| 1.00 | 100 | 28 | 72 |
| 2.00 | 100 | 22 | 78 |
| 2.80 | 100 | 22 | 78 |
| Sand coated with oxidized iron | | | |
| 0.0 | 100 | 100 | 0 |
| 0.20 | 100 | 81 | 19 |
| 1.00 | 100 | 54 | 46 |
| 2.00 | 100 | 32 | 68 |
| 2.80 | 100 | 18 | 82 |

Example 4

Removal of As(III) by Coated Pumice

A batch test was conducted by using Arsenic(III) {$As_2O_3$} spiked water and oxidized iron coated pumice stone as adsorbent media. The initial concentration of As(III) {$As_2O_3$} in the water was 100 µg/L. Coated pumice stones were weighed (0.2, 1.0, 2.0 grams as indicated) and transferred into individual batch reactors (plastic bottles) containing 1000 ml Arsenic(III) {$As_2O_3$} spiked water. The slurry was agitated with a mechanical shaker for 14 hours to obtain adequate contact between arsenic in the water and the adsorbents. After sufficient contact time, water samples from each reactor were drawn, filtered, preserved with nitric acid, and delivered to the laboratory for analysis for total arsenic. The laboratory results and other relevant data for the batch test are presented in Table 4.

TABLE 4

| Adsorbent (g/L) | $C_e$ As(V) (µg/L) | $C_e$ As(III) (µg/L) |
|---|---|---|
| 0.0 | 100 | 100 |
| 0.20 | 29 | 62 |
| 1.00 | 8 | 38 |
| 2.00 | 2 | 28 |

Example 5

Removal of As(III) by Oxidized Iron Coated Pumice

Figure 6:
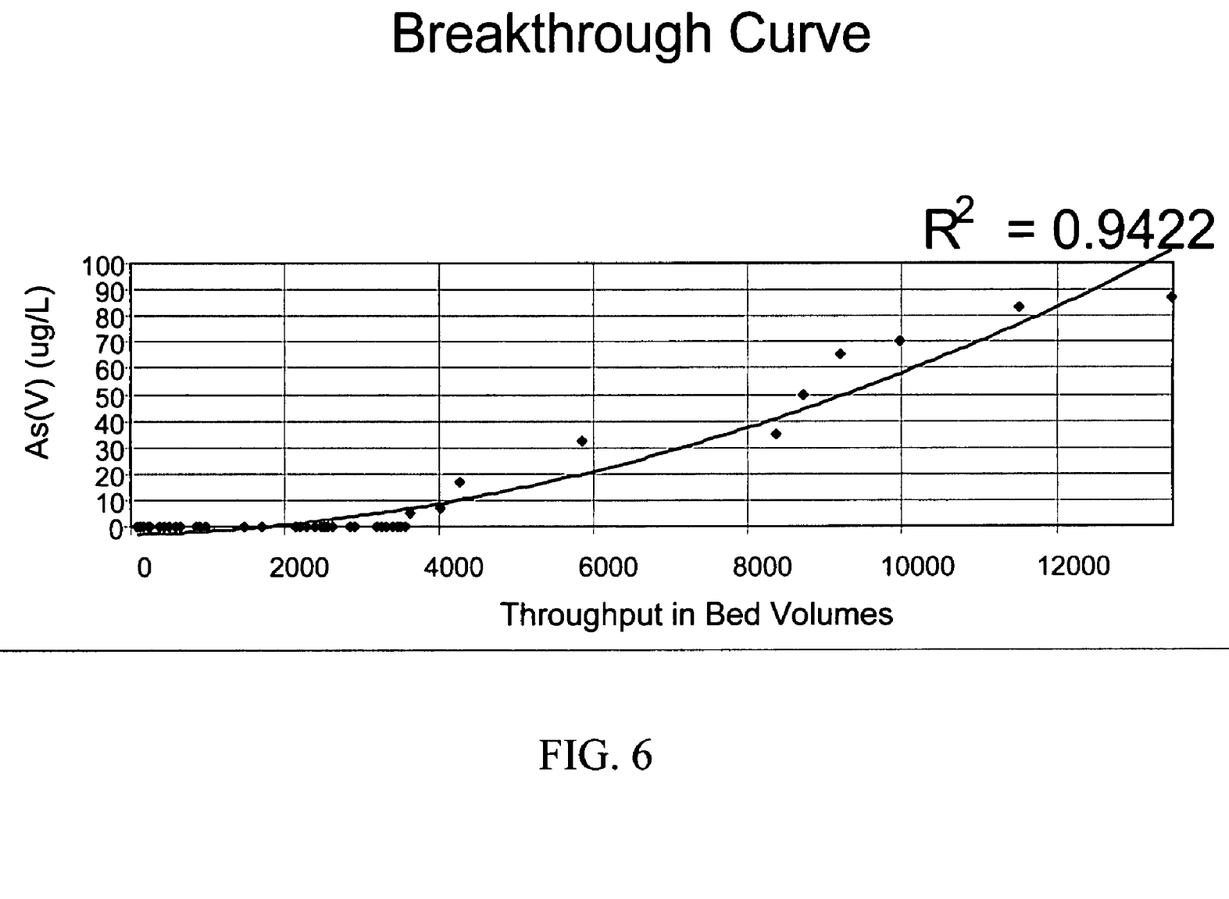
FIG. 6: The graph demonstrates the arsenic adsorbent capacity of pumice coated with oxidized iron (from Table 5). X-axis represents the number of bed volumes (BV) flowed through the column, and the Y-axis indicates that concentration of arsenic in the effluent.

The concentration of arsenic(V) {$Na_2HAsO_4 \cdot 7H_2O$} in the feed water was 100 µg/L, and the effluent concentration was below detection limit (<2 µg/L). Once the adsorbent areas in the columns were filled with arsenic, the arsenic concentration in the effluent was detected, and breakthrough began. As the sorption zone in the column disappeared, the arsenic in the effluent increased to 100 µg/L, which equaled the influent arsenic concentration, fed to the laboratory column resulting in a breakthrough curve. The results of the laboratory column test are presented in Table 5 and the adsorption breakthrough curve is presented in the FIG. 6. The breakthrough volume for the test column is equal to the breakthrough time multiplied by the flow rate to the test column. At complete exhaustion, the arsenic concentration of the effluent was 100 µg/L. Low arsenic concentrations were achieved for approximately 1100 hours of laboratory column operation. The breakthrough did not start until at least 600 liters of water passed through the Iron Oxide Coated Pumice Stone (IOCPS) media. The volume of coated pumice stone in the laboratory test column was 150 cm³. Therefore, the breakthrough volume (VB) of effluent water, which met USEPA's MCL of 10 µg/L was 4000 Bed Volumes as calculated below.

$$BV = ((600 \text{liters} * 1000 \text{ml/liter})/(150 \text{cm}^3 \text{per BV})) * (1 \text{cm}^3/\text{ml}) = 4000 \text{ Bed Volumes(BV)}$$

TABLE 5

| As (V) (µg/L) | | Quantity of Water | |
|---|---|---|---|
| Influent | Effluent | Treated (L) | Bed Volumes |
| 100 | <5 | 13 | 87 |
| 100 | <5 | 76 | 507 |
| 100 | <5 | 145 | 967 |
| 100 | <5 | 221 | 1472 |
| 100 | <5 | 322 | 2147 |
| 100 | <5 | 437 | 2913 |
| 100 | <5 | 527 | 3513 |
| 100 | <5 | 535 | 3567 |
| 100 | 7 | 603 | 4020 |
| 100 | 17 | 643 | 4287 |
| 100 | 32 | 877 | 5848 |
| 100 | 35 | 1254 | 8363 |
| 100 | 50 | 1310 | 8733 |
| 100 | 65 | 1379 | 9193 |
| 100 | 70 | 1495 | 9967 |
| 100 | 83 | 1727 | 11513 |
| 100 | 87 | 2021 | 13473 |

Example 6

Determination of Optimal Contact Time

To determine the optimal contact time for efficient removal of As from contaminated water the pumice coated with oxidized iron was incubated with the contaminated water for a range of time intervals. The results from these studies are presented in the Table 6. Data indicated that the optimum contact time required to remove arsenic(V) by the coated pumice stone was 8 to 10 minutes.

TABLE 6

| Residence Time (Min) | Final concentration of As (µg/L) | EPA maximal content level |
|---|---|---|
| 0 | 100 | 10 |
| 2 | 30 | 10 |
| 3 | 21 | 10 |
| 4 | 19 | 10 |
| 5 | 16 | 10 |
| 6 | 15 | 10 |
| 7 | 11 | 10 |
| 8 | 9 | 10 |
| 9 | 7 | 10 |
| 10 | 4 | 10 |

Example 7

Removal of As(V) is pH Dependent

Studies were undertaken to determine the efficiency of As(V) removal over a range water pH values. As(V) solutions were prepared by diluting 10.0 ml As(V) contaminated water (10 mg/L) into 1000 ml with DI water and adjusting its pH to about 4, 7, or 10 with $HNO_3$, $HNO_3$ and NaOH, or NaOH solutions respectively. These solutions were subjected to batch reaction with coated pumice as previous described and As removal was ascertained. Increasing pH from 4.0 to 10.0 decreased the adsorption of arsenic by 100%. At pH 4.0, 7.0, and 10.0, the absorption of Arsenic(V) was 98%, 39%, and 0% respectively. Several studies have also shown, that the optimum pH for arsenic removal by absorption process to be in the range of 5.5 to 6.0.

Example 8

Analysis of Spent Coated Pumice

The spent oxidized iron coated pumice stone was analyzed for total iron, total arsenic, and Toxicity Characteristics Leachate Procedure (TCLP). TCLP was developed by the USEPA to characterize the leachability of an industrial waste when disposed into the sanitary landfill). Results for this study indicted that spent media had a total iron content of 26,800 mg/kg, a total arsenic was 1,860 mg/kg, and the TCLP-Arsenic was 0.1 mg/L. The regulatory limit for TCLP-Arsenic for landfill disposal is 5.0 mg/L; therefore, the spent pumice stone is non-hazardous waste and may be disposed in a sanitary landfill.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

U.S. Pat. No. 6,328,777
U.S. Pat. No. 6,383,395
U.S. Pat. No. 6,779,411
U.S. Pat. No. 6,841,066
U.S. Pat. No. 6,843,912
U.S. Pat. No. 6,852,224
U.S. Pat. No. 6,863,825
U.S. Pat. No. 6,872,303
U.S. Pat. No. D 451,602
U.S. Pat. No. D 501,912
Abernathy et al., *Environ. Health Perspect.,* 107(7):593-597, 1999.
Adeel and Ali, In: *A Comparative Evaluation and Field Implementation of Treatment Technologies for Arsenic Removal from Groundwater*, Proc. Intl. Workshop Arsenic Mitigation in Bangladesh, Rural Dev. Coop., Bangladesh, 1-11, 2002.
Anuradha et al., *Water Research,* 35(18):4474-4479, 2001.
Driehaus et al., *J. of Water Services Res. Tech.,* 47(1):30-35, 1998.
EAWAG, http:///www.sodis.ch/, 1999.
Elizalde-Gonzalez et al., *Chem. Engineering J.,* 81:187-195, 2000.
Emett and Khoe, *Water Res.,* 35(3):649-656, 2001.
Ghurye and Clifford, Proc., AWWA Water Quality Technology Conference, 2000.
Ghurye and Clifford, U.S. Environmental Protection Agency publication no. EPA/600/R-01/021, 2001.
Joshi and Chaudhuri, *J. Environ. Eng.,* 769-771, 1996.
Johnston and Heijnen, International Workshop on Technologies for Arsenic Removal from Drinking Water, 2001.
Nieminski and Evans, *Ozone Sci. Eng.,* 17(3):297-309, 1995.
Thirunavukkarasu et al., *Water research Commission Rep. of South Africa.* 29(2):161-170, 2003.
United States Environmental Protection Agency. Technologies and Costs for Removal of Arsenic from Drinking Water (EPA 815-R-00-028), www.epa.gov/safewater, 2000.

What is claimed is:

1. A method of removing arsenic from water comprising the step of contacting the water with oxidized metal coated pumice, thereby reducing the level of arsenic in the water.

2. The method of claim 1, further comprising, prior to the step of contacting the water with the oxidized metal coated pumice, the additional step of exposing the water to an oxidizing agent.

3. The method of claim 1, further comprising, prior to the step of contacting the water with the oxidized metal coated pumice, the additional step of adjusting the pH of the water.

4. The method of claim 1, wherein the oxidized metal coated pumice is oxidized iron coated pumice.

5. The method of claim 1, wherein arsenic levels are reduced to less than 10 µg/L.

6. The method of claim 2, wherein the oxidizing agent converts As(III) to As(V).

7. The method of claim 3, wherein the water is adjusted to a pH of less than about 7.0.

8. The method of claim 1, wherein the water is drinking water.

9. The method of claim 8, wherein the drinking water is suitable for animal consumption.

10. The method in claim 9, wherein the drinking water is suitable for human consumption.

11. The method of claim 1, wherein the oxidized metal coated pumice is comprised in a column.

12. The method of claim 11, wherein the water is brought in contact with the iron coated pumice by passing the water through the column.

13. The method of claim 12, wherein the water is passed through the column(s) in an up flow direction.

14. The method of claim 12, wherein the water is passed through the column by gravity or by siphon.

15. The method of claim 12, wherein the water is passed through the column by a mechanical pump.

16. The method of claim 2, further comprising, prior to the step of contacting the water with the oxidized metal coated pumice, the step of adjusting the pH of the water.

17. The method of claim 2, wherein the water is adjusted to a pH of less than about 7.0.

18. The method of claim 5, wherein arsenic levels are reduced to 9 µg/L.

19. The method of claim 5, wherein arsenic levels are reduced to 4 µg/L.

20. The method of claim 1, wherein arsenic levels are reduced up to 92%.

21. The method of claim 1, wherein arsenic levels are reduced up to 98%.

22. The method of claim 7, wherein the water is adjusted to a pH of about 5.5 to 6.0.

23. The method of claim 7, wherein the water is adjusted to a pH of about 5.0.

24. The method of claim 7, wherein the water is adjusted to a pH of about 4.0.

* * * * *

UNITED STATES PATENT AND TRADEMARK OFFICE
CERTIFICATE OF CORRECTION

PATENT NO. : 7,491,335 B2
APPLICATION NO. : 11/433638
DATED : February 17, 2009
INVENTOR(S) : Pratap G. Reddy et al.

It is certified that error appears in the above-identified patent and that said Letters Patent is hereby corrected as shown below:

In the drawings, Sheet 2, FIG.2, delete "Atone" and insert --Stone-- therefor.

Signed and Sealed this

First Day of September, 2009

David J. Kappos
*Director of the United States Patent and Trademark Office*